US008255242B2

(12) United States Patent
Kohl (10) Patent No.: US 8,255,242 B2
(45) Date of Patent: *Aug. 28, 2012

(54) SYSTEM AND PROCESS FOR DISPENSING VALUE IN RESPONSE TO AN AUTHORIZATION OVER AN ELECTRIC DATA NETWORK (75) Inventor: Donald Kohl, Coral Springs, FL (US)

(73) Assignee: Efunds Corporation, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/768,438

(22) Filed: Apr. 27, 2010

(65) Prior Publication Data

US 2011/0077976 A1  Mar. 31, 2011

Related U.S. Application Data (63) Continuation of application No. 09/780,890, filed on Feb. 10, 2001, now Pat. No. 7,707,048.

(60) Provisional application No. 60/181,486, filed on Feb. 10, 2000.

(51) Int. Cl.
G06Q 40/00 (2012.01)

(52) U.S. Cl. ............... 705/4; 705/26; 705/34; 235/379; 235/380

(58) Field of Classification Search ................ 705/4, 35, 705/36 R
See application file for complete search history.

(56) References Cited

U.S. PATENT DOCUMENTS

| 5,557,516 A * | 9/1996 | Hogan ............................ 705/41 |
| 2002/0152180 A1 * | 10/2002 | Turgeon ......................... 705/72 |
| 2006/0080186 A1 * | 4/2006 | Burchetta et al. ............... 705/26 |

* cited by examiner

Primary Examiner — Vanel Frenel
(74) Attorney, Agent, or Firm — Finnegan, Henderson, Farabow, Garrett & Dunner LLP (57) ABSTRACT An insurance payment distribution system is disclosed for distributing data representative of money from a central station to selected individuals to be used at selected locations. The system includes a plurality of distribution payment cards and a remote card processing unit. The distribution payment cards are useable at the selected locations. Each payment card is capable of receiving information representative of a certain amount of money, and is capable of receiving information representative of permitted locations at which the each card may be used. The remote card processing unit is in communication with a computer network including a central computer system. The remote card processing unit is for modifying the information receivable on the cards responsive to information received via the computer network.

19 Claims, 8 Drawing Sheets

SYSTEM AND PROCESS FOR DISPENSING VALUE IN RESPONSE TO AN AUTHORIZATION OVER AN ELECTRIC DATA NETWORK

This is a continuation of application Ser. No. 09/780,890, filed Feb. 10, 2001 which issued as U.S. Pat. No. 7,707,048 on Apr. 27, 2010 and claims the benefit of U.S. provisional application No. 60/181,486, filed Feb. 10, 2000, all of which are incorporated herein by reference.

BACKGROUND OF THE INVENTION

The invention relates to systems and processes for dispensing value to a cardholder in response to an authorization over an electronic data network. A variety of cards are available to enable a customer to electronically interfere with a financial institution. Credit cards (plastic cards having a magnetic stripe with an encoded account number), are a well known example of such cards and card systems. These cards may be read by special terminals at a merchant's site, commonly referred to as point-of-sale (POS) terminals. The account number may then be transmitted over a network, such as the Mastercard or Visa network. In addition to the account number, the amount of the transaction, card expiration date, and merchant information are also transmitted for authorization. A remote computer checks a database to determine whether the credit card customer is still within their credit limit before authorizing the purchase.

Another type of card is a debit card, which is not used to extend credit but rather to withdraw cash or pay a merchant immediately. The amount of the transaction is deducted from the customer's checking account, which the customer may periodically replenish. The customer must have the money in the account before the transaction is approved, rather than having to pay the money on credit extended, as with a standard credit card.

A further type of card is an automated teller machine (ATM) card. These cards are typically issued by a financial institution or a bank, allowing a customer to access the customer's checking or savings account for withdrawal from a remote ATM. The remote ATM is connected through an ATM interchange to various banks subscribing to a particular ATM network. This causes an immediate deduction from the customer's account, similar to a debit card. The immediate deduction is actually a same day or same night deduction, since the amount of the transaction is typically recorded and then actually processed in batch mode at night with other transactions. One potential shortcoming of the ATM system is if the ATM card is lost or stolen, and used by another person. The use of a Personal Identification Number (PIN) that is known only to the customer, eliminates much of the risk. Another control is imposing a daily limit (e.g., $200), on any withdrawals by a particular card during any day.

Further types of cards store the account amount directly on the card. An example would be a transit card, such as cards for the California's Bay Area Transit (BART) district. When BART cards are purchased, the dollar amount of the card is magnetically recorded on the card. Each time the card is used by passing it through an access terminal, the fare is deducted from the amount on the card, and a new card value is magnetically recorded on the card itself. An advantage of such a card is that if it is lost or stolen, the potential loss value is only the amount recorded on the card itself. A disadvantage is that there is no ability to contact the issuer and freeze the remaining account balance.

Other than these types of cards, and currency itself, a further conventional device for obtaining cash is a traveler's check. Traveler's checks are generally desirable as compared to currency because of the signature authorization required and the ability to report them as stolen or lost and identify them by serial number. In addition, traveler's checks are issued in limited amounts, which may limit possible exposure. Unlike debit cards or credit cards or even ATM cards, there is no account number that may easily be verified online to see if the account has been closed.

None of these card or payment systems, however, provides the multiple types of control over the distribution, use, and authorization that is sometimes desired in an insurance payment systems. For example, in an insurance payment system, it is sometimes desirable to control the type of goods that may be purchased, the types of stores at which an insurance payment may be used, and/or the specific identities of the stores at which an insurance payment may be used.

There is a need, therefore, for a payment system for insurance industries in which improved control over such payment may be employed.

SUMMARY OF THE INVENTION

The invention provides an insurance payment distribution system for distributing data representative of money from a central station to selected individuals to be used at selected locations. The system includes a plurality of distribution payment cards and a remote card processing unit. The distribution payment cards are useable at the selected locations. Each payment card is capable of receiving information representative of a certain amount of money, and is capable of receiving information representative of permitted locations at which the each card may be used. The remote card processing unit is in communication with a computer network including a central computer system. The remote card processing unit is for modifying the information receivable on the cards responsive to information received via the computer network.

BRIEF DESCRIPTION OF THE DRAWINGS

The following description may be further understood with reference to the accompanying drawings in which.

The drawings are shown for illustrative purposes only.

DETAILED DESCRIPTION OF THE INVENTION

In an illustrated embodiment, the invention provides an on-line transaction processing system for payment distribution that provides for management of multiple discrete amounts of funds associated with a card account by utilizing existing magnetic stripe technology in conjunction with host based business rules. The system allows the card provider to establish multiple types of purses for each account to allocate specific amounts of funds to the purses. Further, the system allows the provider to restrict the usage of the funds in the purses to specific merchant establishments or a single merchant location via their merchant number or to a group of merchant establishments as defined by their merchant category code (MCC). The usage of the card can be restricted to or include cash advances and ATM transactions. When authorization is sought, the system verifies the funds available in a purse and determines whether the merchant requesting authorization is an allowable merchant establishment.

In a card processing system of the invention, the company that interfaces with the cardholder applies value to an account. For example, in the insurance claims environment, the insurance company adjuster would apply the value of the claim to the card. In other markets segments, the company might apply value at the request of the customer. In most cases, a card (typically plastic) is created and given to the cardholder that will be used later to facilitate the authorization process.

Once the cardholder has possession of the card and after the card has been activated, the cardholder is now able to attempt to use the card in the retail environment. Once the customer decides what goods or services they wish to purchase, the cardholder or merchant swipes their card through a magnetic stripe reading point-of-sale device. The merchant inputs the amount of the pending purchase and hits a key that causes the transaction data to go from the merchant network through the card association (VISA or MasterCard) to the system provider.

Figure 1:
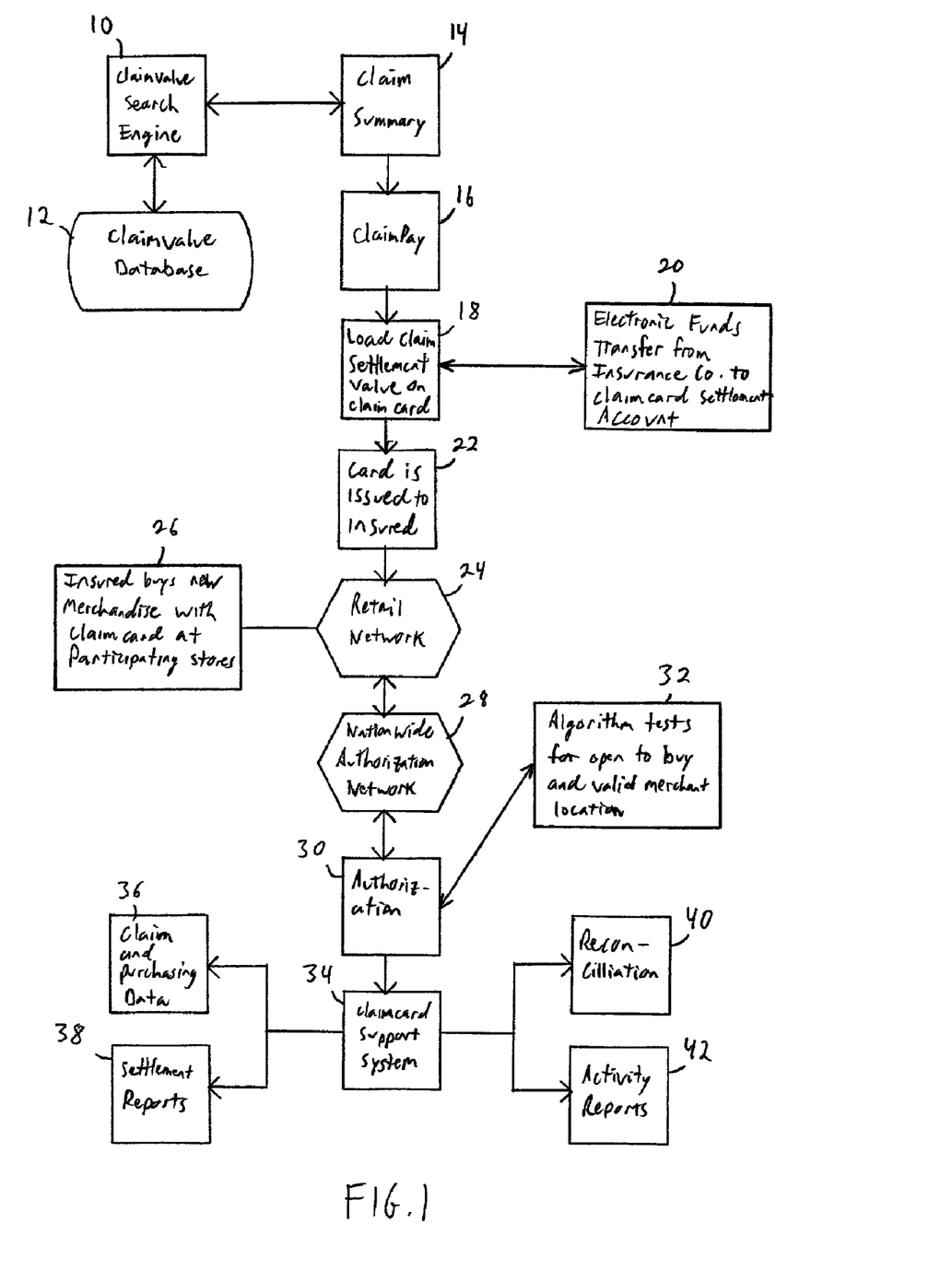
FIG. 1 shows an illustrative view of a system in accordance with an embodiment of the invention.

As shown in FIG. 1, A claim value search engine 10 communicates with a claim value database 12, in processing a claim summary 14. A claim payment is commenced at 16 by loading a value of a claim settlement onto a card 18. The value represents an electronic funds transfer from an insurance company for the card settlement account 20. The card is then issued to the insured 22, who may then take the card to a retail network 24. The retail network 24 includes a variety of retail stores, and the insured may purchase replacement merchandise with the card at participating and authorized retailers 26. The authorization is achieved via an authorization network 28, which communicates with an authorization processor 30. The authorization algorithm tests for whether the merchant location is valid and whether the merchandise may be purchased 32. A computer support system 34 then generates a card holder claim and purchasing data report 36, a insurance company settlement report 38, a reconciliation and financial settlement to individual insurance company account 40, and an activity report to retail networks 42.

Generally, when the authorization transaction arrives at the system provider, the system attempts to find the corresponding account record in the database. If the record is not found then the authorization request is declined. If the record is found, then basic validation edits of the authorization request data are performed such as correct status, correct expiration date, valid Merchant Category Code (MCC), correct Card Verification Value (CVV) and correct Personal Identification Number (PIN). If the request fails any of these edits, then the authorization request is declined. If the edit checks are valid then the system determines the best fit authorization strategy and the purse strategy for this cardholder account from the account record. If either strategy is undefined or unavailable then the authorization request is declined. If both strategies are available then the amount is determined to be valid using those strategies as described below and outlined in.

In order to determine whether the amount of the authorization request is acceptable, the system locates the account limits record. If the accounts limits record is unavailable then the transaction is declined. With the account limits record the amount in the authorization request is compared against all predefined amount limits based on, not limited to, usage of type of transaction such as cash advance or ATM or mail order. If the amount in the authorization record fails any of the above tests, then the authorization request is declined. The system then determines whether the current purse has an assigned merchant network or MCC network. If there is no merchant or MCC networks assigned, then the authorization amount is compared to the available purse amount. If the authorization amount is greater than the purse amount then the system searches for additional purses. If the there are no additional purses, then the authorization request is declined, all database updates are rolled back, and a fail result is returned. If there are additional purses available then the system reduces the authorization request amount by the Available Balance of this purse, reduces the Available Balance of this purse to zero, locates the next available purse and criteria to determine authorization approval begins again at the top of this paragraph. If the authorization amount is less than or equal to the purse amount then the Available Balance is reduced by the authorization amount, a pass result is set and the authorization is processed as an approval.

Figure 2A:
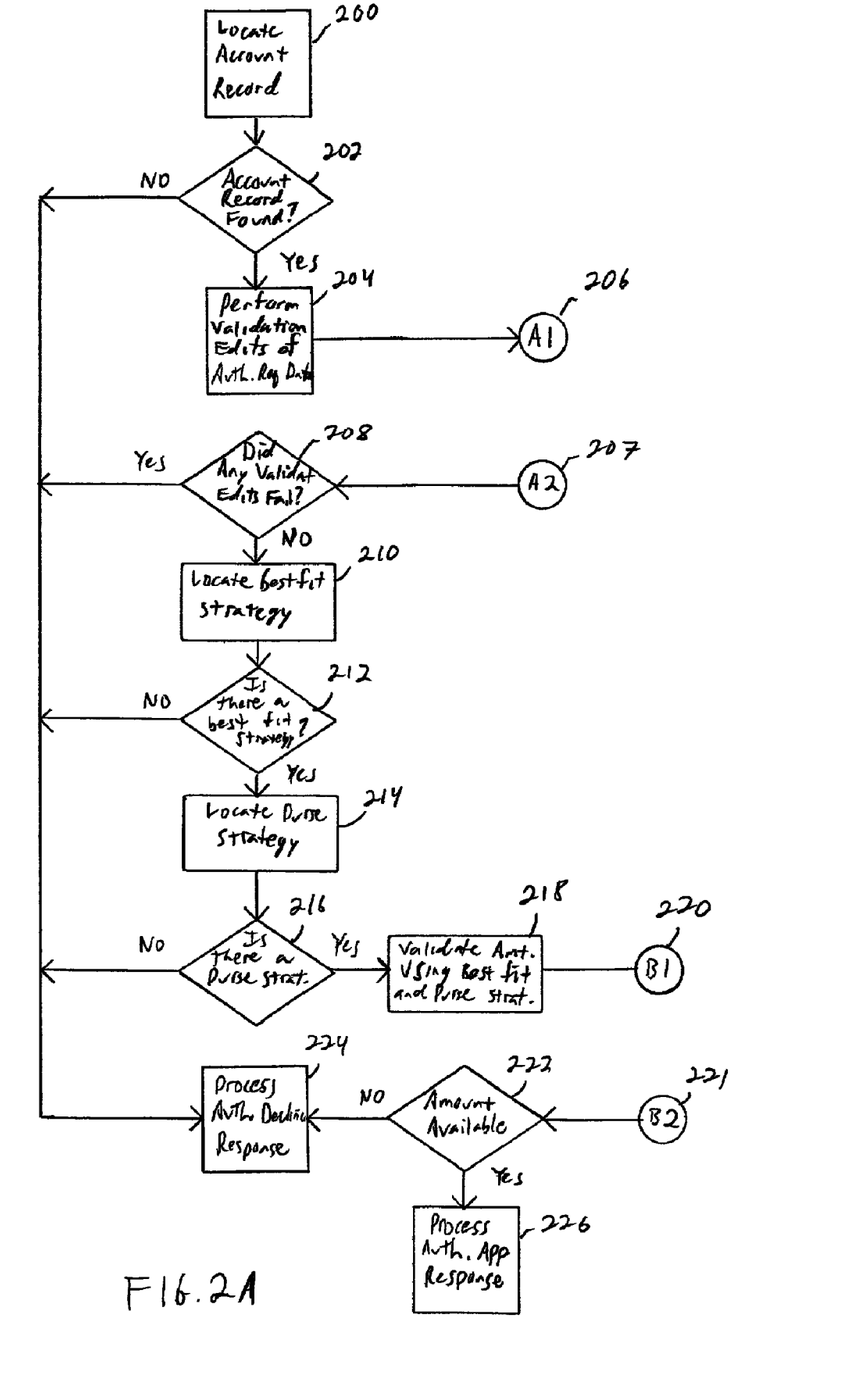
FIGS. 2A-2F show illustrative views of a method of operation of an embodiment of a system of the invention.
Figure 2B:
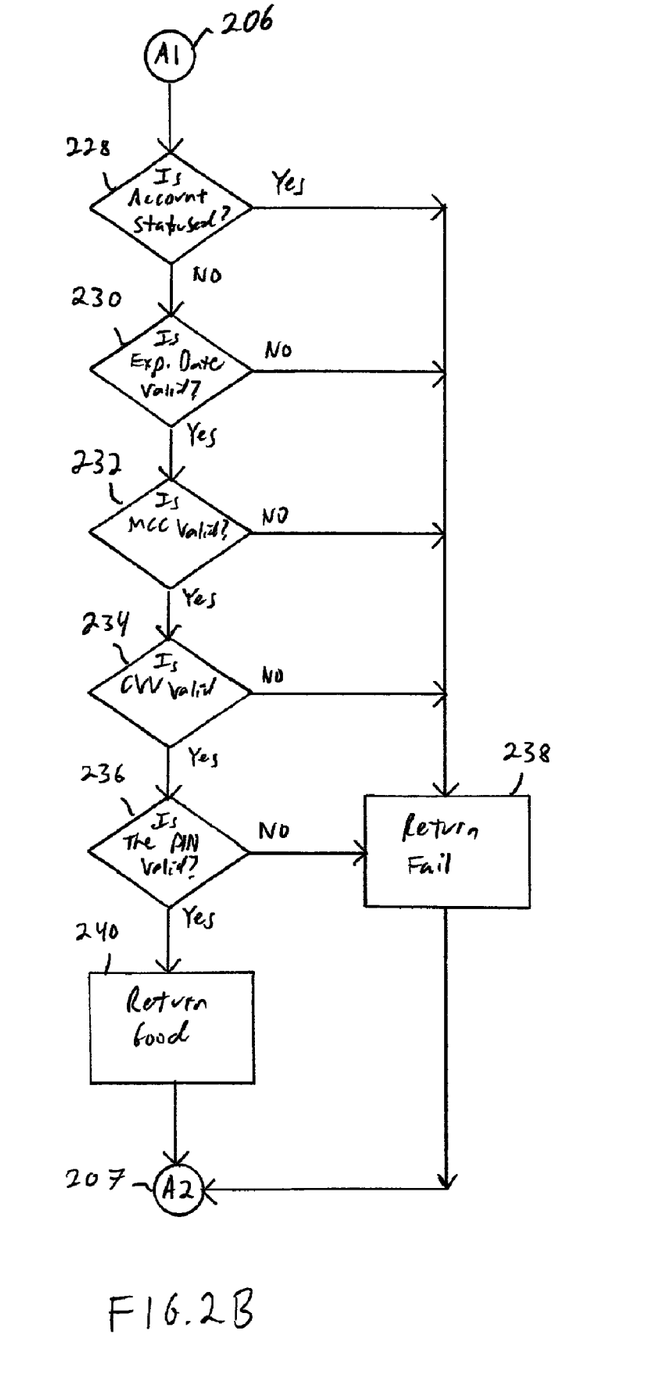
Figure 2C:
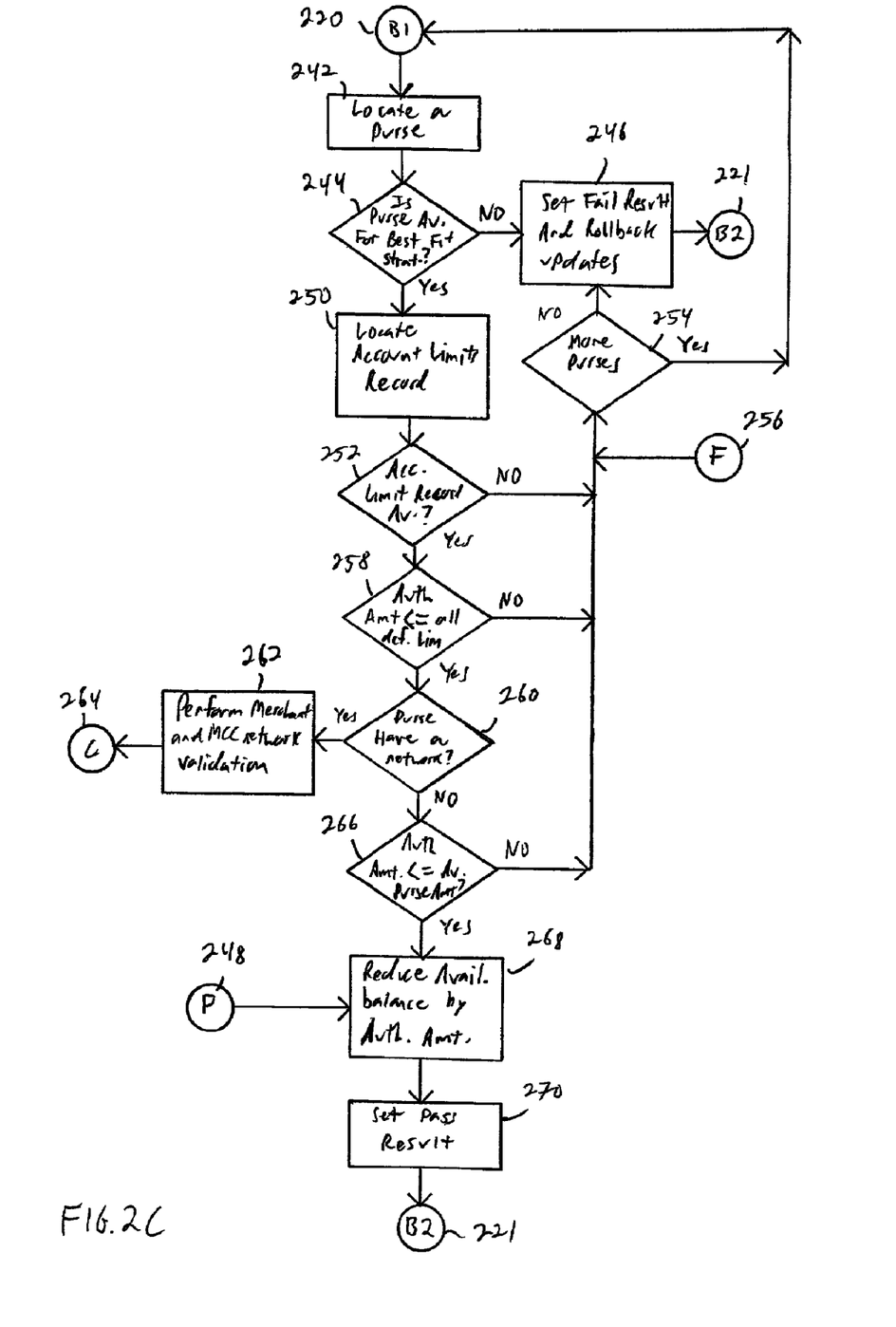

As specifically shown in FIG. 2A, an account record is located (step 210). If no account record is found (step 202), then process authorization is declined and such an indication of this is provided (step 224). If the account record is located (step 202), then the basic validation edits of the authorization request data are performed (step 204). The system then executes a validation routine as indicated at Al (step 206). The system returns from the validation routine at A2 (step 207). The validation routine is shown in FIG. 2B. If any validation edits failed (step 208), then the authorization is declined (step 224). If none failed (step 208), then the system locates a best fit strategy (step 210). If a best fit strategy does not exist (step 212), then authorization is declined (step 224). If there is a best fit strategy (step 212), then the system locates a purse strategy (step 214). If a purse strategy does not exist (step 216), then authorization is declined (step 224). If there is a purse strategy (step 216), then the system validates the request using the located best fit and purse strategies (step 218). The system then executes a purse processing routine at B1 (step 220). The system returns from the purse processing routine at B2 (step 221). The purse processing routine is shown in FIG. 2C. The system then queries whether the requested amount is available (step 222). If the amount is not available (step 222), then authorization is declined (step 224). If the amount is available (step 222), then authorization is approved and such a response is provided (step 226).

As shown in FIG. 2B, the validation routine begins (step 206) by determining whether the account is statused (step 228). If so, then the routine returns a result that validation failed (step 238) to the main program (step 207). If the account is not statused (step 228), then the routine determines whether the expiration date is valid (step 230). If not, then the routine returns a validation failed result (steps 238 and 207), and if so, then the routine determines whether the MCC is valid (step 232). If the MCC is valid (step 232), then the routine determines whether the card verification value (CVV) is valid (step 234). If not, then the routine returns a fail validation result (steps 233 and 207). If the CVV value is valid, then the routine lastly checks whether the PIN value is valid (step 236). If not, the routine returns a fail validation result (steps 233 and 207). If so, the routine returns a passed validation result (steps 240 and 207).

Figure 2D:
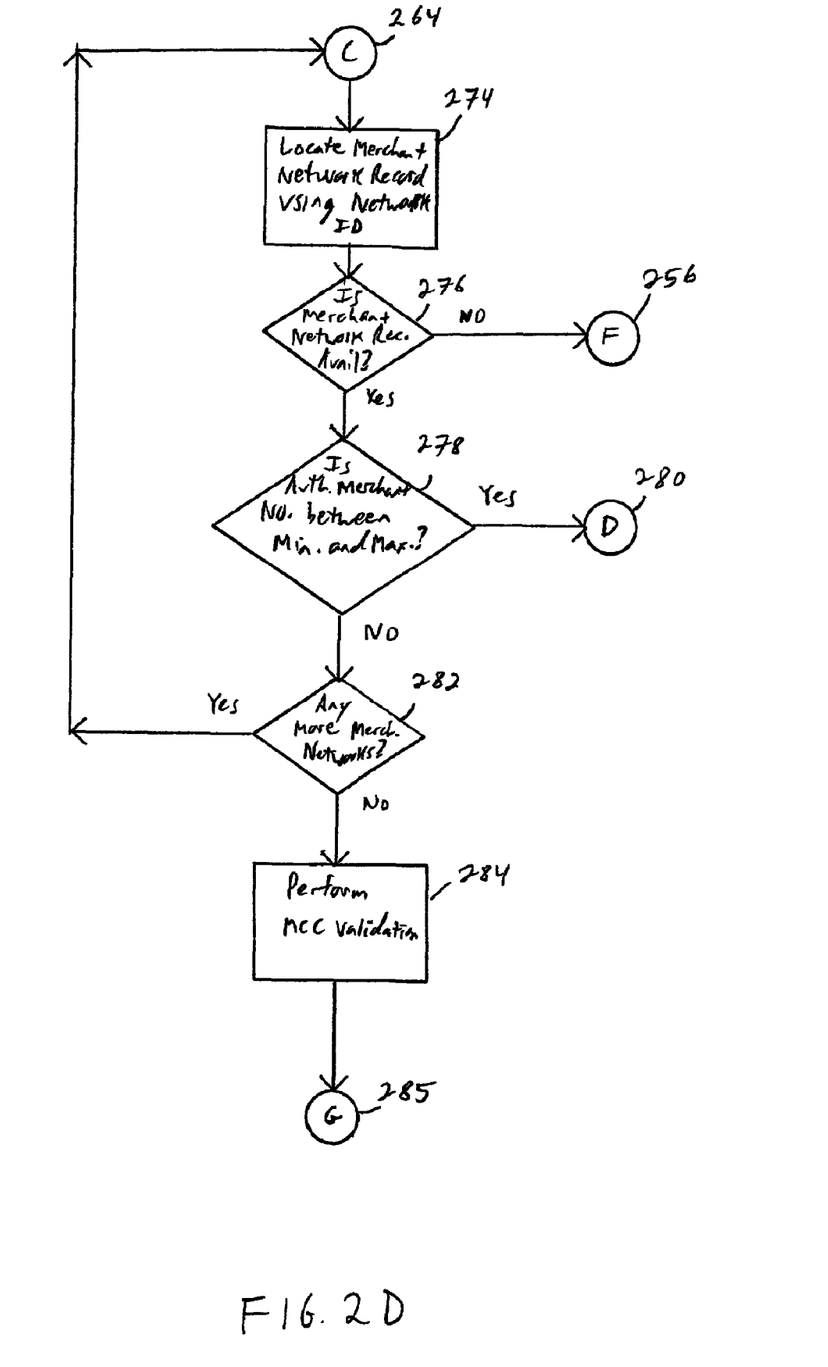
Figure 2E:
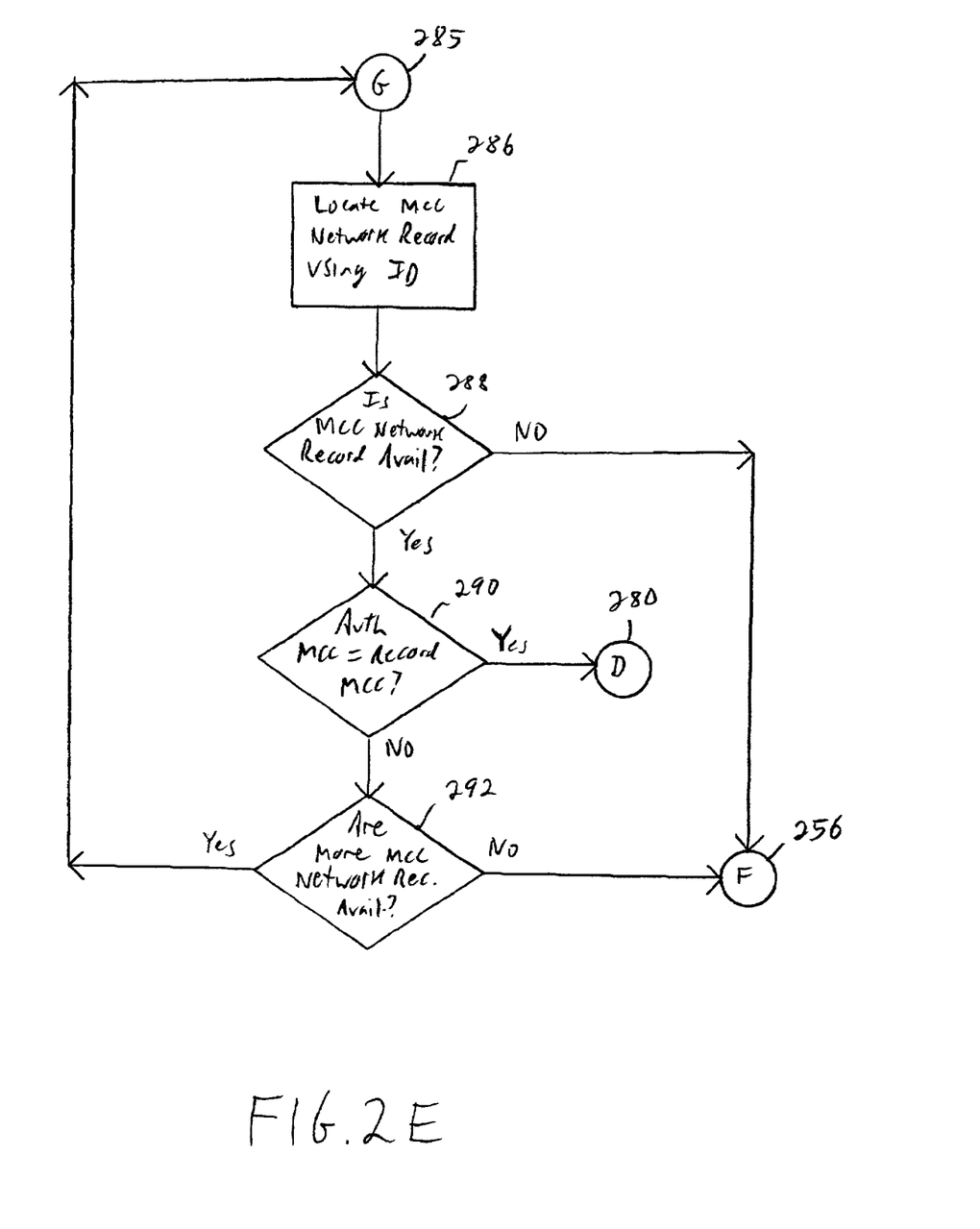
Figure 2F:
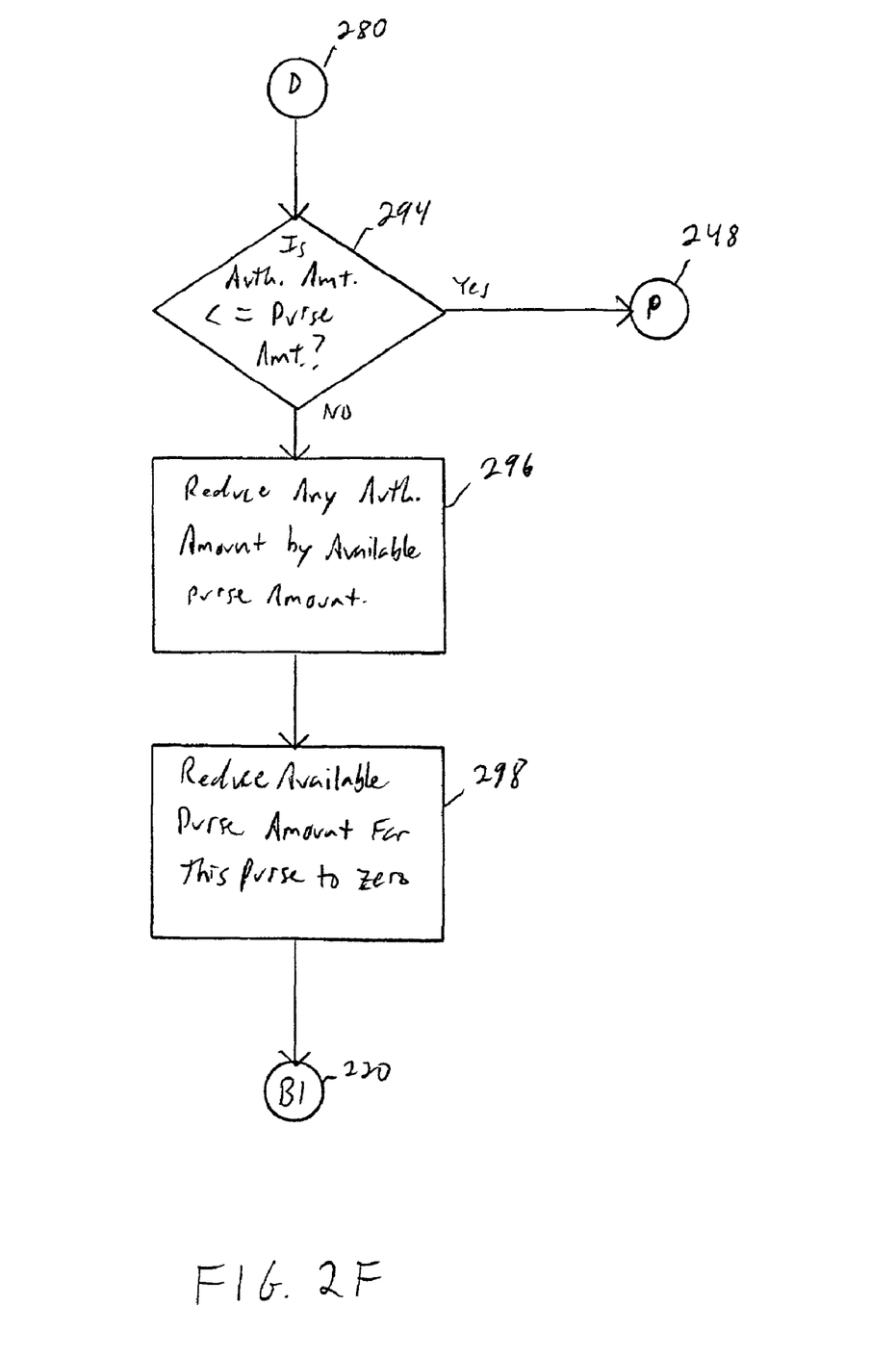

As shown in FIG. 2C, the purse processing routine begins (step 220) by locating a purse (step 242). If a purse is not available for this best fit strategy (step 244), then the routine sets the result field to fail, and any updates are rolled back (step 246), and the routine returns to the main program as shown at B2 (step 221). If a purse is available for this best fit strategy (step 244), then the routine locates the account limits in the record (step 250). If the account limits record is not available (step 252), then the routine determines whether more purses are available (step 254). If not, the routine returns a fail result to the main program (steps 246 and 221). If so, then the routine restarts (step 220). If the account limits record is available (step 252), then the routine determines whether the authorization amount is less than or equal to the defined limits (step 258). If not, then the routine looks for more purses (step 254). If so, then the routine determines whether the purse has a merchant or MCC network (step 260). If so, then the routine performs a merchant and network validation (step 262), which begins at step 264. The merchant network and validation routine is shown in FIGS. 2D-2F. If the purse does not have a merchant or MCC network (step 260), then the routine determines whether the authorization amount is less than or equal to the available purse amount (step 266). If not, then the routine looks for more purses (step 254). If so, then the routine reduces the available balance in this purse by the authorization amount (step 268), sets the purse processing routine result to pass (step 270) and returns to the main program at B2 (step 221).

If there are merchant or MCC networks assigned to this purse then using the network identification, the merchant network record or the MCC network record is located. If the system fails to locate either record then the fail result is set, any database updates are roller back and the authorization request is declined. Otherwise, the merchant number or MCC in the authorization request is compared to the number or range of numbers in the merchant or MCC network record. If the comparison fails then the system continues with each entry in the network records until all records are tested. If the merchant number or MCC number fails for every entry in the record for this purse, then the availability of additional purses is checked. If there are no additional purses, then the authorization request is declined, all database updates are rolled back, and a fail result is returned. If there are additional purses available, then the system reduces the authorization request amount by the Available Balance of this purse, reduces the Available Balance of this purse to zero, locates the next available purse and the criteria to determine authorization approval begins again by determining whether the amount of the authorization request is acceptable.

As specifically shown in FIG. 2D, the merchant network and validation routine begins at C (step 264) by locating the merchant network record using the network identification (step 274). If no merchant network record is available (step 276), then the routine returns to step 256 shown in FIG. 2C. If a merchant network record is available (step 276), then the routine determines whether the authorization merchant number is between the record merchant minimum number and the record maximum merchant number (step 278). If so, the system then executes the purse adjustment routine shown at D (step 280), which is shown in FIG. 2F. If not, the system determines whether any more merchant networks are available (step 282). If so, then the routine returns to the beginning (step 264). If not, the routine performs an MCC network validation (step 284), which begins at G (step 285).

As shown in FIG. 2E, the network validation (step 285) begins by using the MCC network ID to locate an MCC network record (step 286). If an MCC network record is not available (step 288), then the routine returns to the purse processing routine at F (step 256) as shown in FIG. 2C. If an MCC network record is available (step 288), then the routine determines whether the authorization MCC is equal to the MCC (step 290). If so, then the routine executes the purse processing routine (step 280) as shown in FIG. 2F. If the authorization MCC is not equal to the MCC (step 290), then routine determines whether there are any more MCC network records (step 292). If so, then the routine restarts by returning to step 285). If not, then the routine returns to the purse processing routine at F (step 256) as shown in FIG. 2C.

As shown in FIG. 2F, the purse processing routine begins (step 280), by determining whether the authorization amount is less than or equal to the purse amount (step 294). If so, then the routine returns to the purse processing routine (step 256) in FIG. 2C. If not, then the routine reduces the authorization amount by the available purse amount (step 296), and then reduces the available purse amount for that purse to zero (step 298). The routine then returns to the beginning of the purse processing routine (step 220) shown in FIG. 2C.

Figure 3:
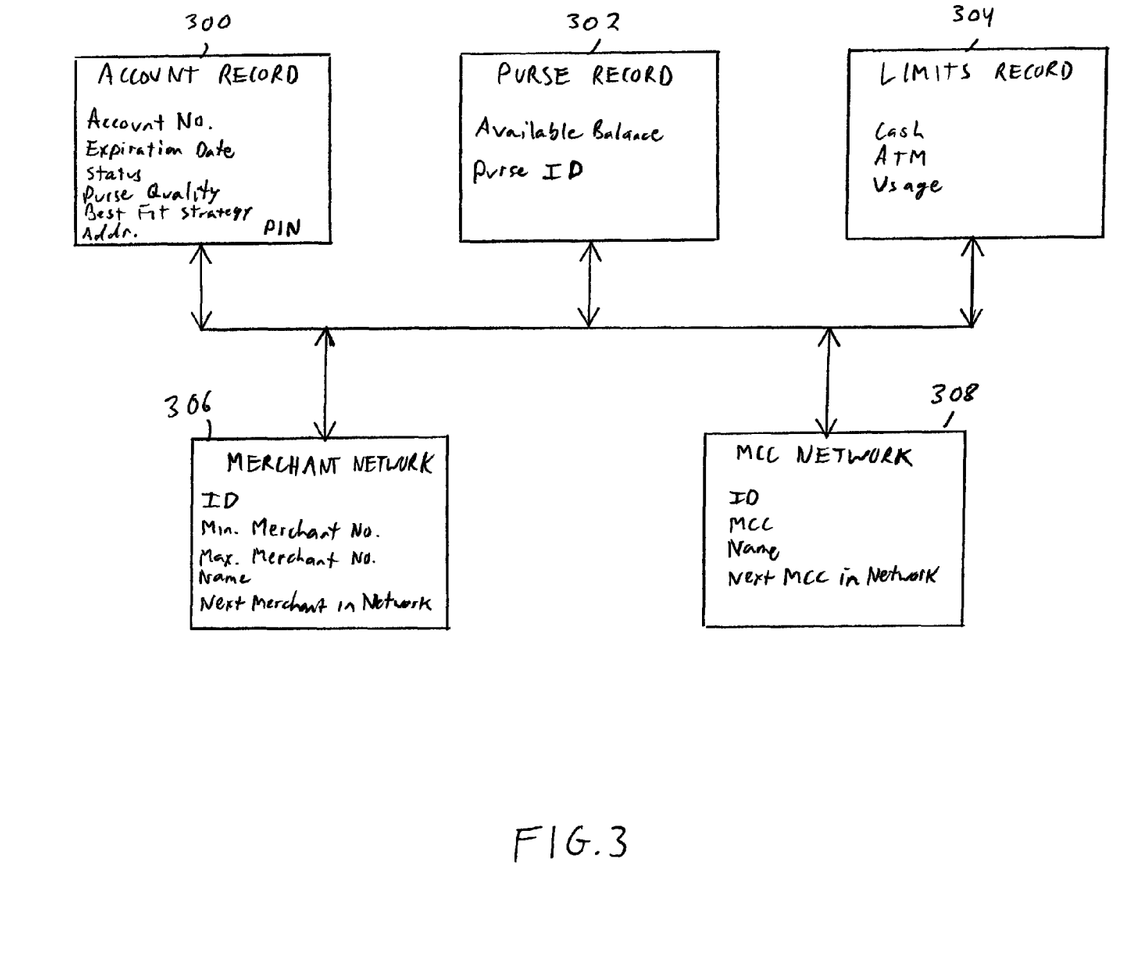
FIG. 3 shows an illustrative view of various records employed in an embodiment of a system of the invention.

As shown in FIG. 3, the Account Record 300 includes fields relating to the account number, the expiration date, the status, the purse quantity, the best fit strategy, the address and the PIN encryption. The Purse Record 302 includes fields relating to the available balance and the purse ID. The Limits Record 304 includes fields relating to the amount of cash, ATMs, and usage. The Merchant Network 306 includes information relating to IDs, the minimum merchant number, the maximum merchant number, the name, and the next merchant in the network. The MCC Network includes information relating to the IDs, the MCC, the name, and the next MCC in the network.

Those skilled in the art will appreciate that numerous modifications and variations may be made to the above disclosed embodiments without departing from the spirit and scope of the present invention.

What is claimed is:

1. A method for distributing insurance payments using claim cards using a central computer, each claim card having a claim card account associated therewith, the method comprising:
   transferring funds to a claim card account in settlement of a claim of an insured party using the central computer;
   storing information identifying one or more permitted locations for use of a claim card associated with the claim card account; and
   permitting access to the claim card for use at the one or more permitted locations.

2. The method of claim 1, further including computing an updated available balance for the claim card account using the central computer after an authorized purchase using the claim card.

3. The method of claim 1, wherein storing the information identifying one or more permitted locations comprises:
   categorizing the one or more permitted locations as stores by a type of merchandise sold.

4. The method of claim 1, wherein storing the information identifying one or more permitted locations comprises:
   storing a name for each of the one or more permitted locations.

5. The method of claim 1, further including determining, using the central computer, whether a merchant category code at which an attempted purchase occurs is valid.

6. The method of claim 1, further including determining, using the central computer, whether a card verification value associated with the claim card is valid.

7. The method of claim 1, further including determining, using the central computer, whether a PIN input by the insured party is valid.

8. The method of claim 1, wherein the claim card is configured to receive and store information representative of an amount of currency.

9. The method of claim 8, wherein the claim card is configured to receive and store information representative of permitted locations at which the claim card may be used.

10. The method of claim 1, further including declining an attempted purchase via a computer network if an attempt is made to use the claim card to purchase merchandise at a location other than a permitted location.

11. A method for distributing insurance payments using claim cards using a system which includes a remote card processing unit in communication with a computer network and a central computer, each claim card having a claim card account associated therewith, the method comprising:

transferring funds to a claim card account in settlement of a claim using the central computer via the computer network, wherein the funds are distributed among a plurality of purses included in the claim card account with each purse having a corresponding balance; and distributing a claim card associated with the claim card account to corresponding insured party.

12. The method of claim 11, wherein a permitted location use restriction associated with the claim card enables limiting the usage of funds to one or more predetermined merchants.

13. The method of claim 12, wherein the one or more predetermined merchants are defined by a merchant category code.

14. The method of claim 12, wherein the one or more predetermined merchants are defined by a merchant number.

15. The method of claim 12, wherein a permitted location use restriction includes limits on cash and ATM usage.

16. The method of claim 12, further including validation edits of the authorization request using the central computer.

17. The method of claim 12, wherein a validation edit includes verification of a PIN number input by the insured party.

18. A method for managing distribution of funds associated with insurance claims, the method, performed by one or more processors, comprising:

electronically associating a claim device having a memory for storing account information with a card settlement account, the account information including an account number associated with the card settlement account and reflecting funds associated with the card settlement account, wherein the funds reflect a settlement of a claim of an insured party;

configuring, using at least one of the processors, the card settlement account for use of the associated funds and claim device to purchase select products or services from select vendors; and generating, using at least one of the processors, a report reflecting a use of the claim device to purchase the select products or services from the select vendors and a corresponding change in the card settlement account.

19. The method of claim 18, further comprising:
providing authorization to use the claim device to purchase a first product or service from a first vendor upon verification that the first product or service in among the select products and services and that the first vendor is among the select vendors.

* * * * *